US00RE41805E

(19) United States
(12) Reissued Patent
Horie et al.

(10) Patent Number: US RE41,805 E
(45) Date of Reissued Patent: Oct. 5, 2010

(54) MOISTURE CURABLE COMPOSITION

(75) Inventors: Yasunobu Horie, Tokyo (JP); Yoshinobu Egawa, Kanagawa-ken (JP); Yuichi Oshima, Tokyo (JP); Hideharu Hashimukai, Tokyo (JP); Tomokazu Wakaume, Tokyo (JP); Hiroshi Aoki, Tokyo (JP)

(73) Assignee: Cemedine Co., Ltd., Tokyo (JP)

(21) Appl. No.: 10/691,433

(22) Filed: Oct. 23, 2003

Related U.S. Patent Documents

Reissue of:
(64) Patent No.: 6,306,966
Issued: Oct. 23, 2001
Appl. No.: 09/422,084
Filed: Oct. 21, 1999

(51) Int. Cl.
*C08L 71/02* (2006.01)

(52) U.S. Cl. ..... 525/106; 525/404; 528/901; 524/493

(58) Field of Classification Search ..... 525/106, 525/404; 528/901; 524/493
See application file for complete search history.

(56) References Cited

FOREIGN PATENT DOCUMENTS

| | | | |
|---|---|---|---|
| EP | 0 339 666 A2 * | | 11/1989 |
| EP | 0 339 666 | | 11/1989 |
| EP | 0 525 769 A1 * | | 2/1993 |
| EP | 0 525 769 | | 2/1993 |
| EP | 0 541 074 A2 * | | 5/1993 |
| EP | 0 541 074 | | 5/1993 |

OTHER PUBLICATIONS

Kroshwitz, Encyclopedia of Chemical Technology, 4th Ed., vol. 21, Wiley—Interscience, p. 1023.*

* cited by examiner

*Primary Examiner*—Kuo-Liang Peng
(74) *Attorney, Agent, or Firm*—Wenderoth, Lind & Ponack L.L.P.

(57) ABSTRACT

A moisture curable composition excellent in transparency, operating efficiency and storage stability, and is suitable for use as an adhesive and a sealing material is provided. The moisture curable composition produced by blending 100 parts by weight of a mixture (A) and 2 parts by weight to 300 parts by weight of amorphous powder (B). The mixture (A) comprises (1) a copolymer having reactive silicon groups which can be cross-linked by hydrolysis, whose molecular chain substantially consists of (i) alkylacrylate and/or alkylmethacrylate monomeric units having an alkyl group with 1 to 8 carbon atoms, and (ii) alkylacrylate and/or alkylmethacrylate monomeric units having an alkyl group with 10 or more carbon atoms, and (2) a polymer substantially consisting of oxyalkylene including reactive silicon groups which can be cross-linked by hydrolysis. The amorphous powder (B) has a grain diameter ranging from 0.01 μm to 300 μm.

7 Claims, No Drawings

MOISTURE CURABLE COMPOSITION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a moisture curable composition suitable for use as an adhesive, a sealing material or the like which is required to be transparent.

2. Description of Related Art

Currently, a composition produced by normally blending an inorganic powder such as calcium carbonate or the like into a polymer having reactive silicon groups has been used in practice as an adhesive, a sealing material, or the like. The effect of blending the inorganic powder in this case is to give cohesive power to the polymer mainly having the reactive silicon groups, and to improve the adhesiveness on the interface with an adherend.

In recent years, when a transparent substrate such as glass, polycarbonate, acrylic resin or the like is adhered or sealed with an adhesive or a sealing material, the adhesive or the sealing material is also required to be transparent from the design viewpoint. However, there has been no transparent polymeric composition having reactive silicon groups which satisfies sufficient property of an adhesive or a sealing material.

In order to give the transparency to an adhesive and a sealing material, there are the following two methods: (1) a method without blending a filler; and (2) a method of blending an inorganic filler having a small grain diameter. However, the method (1) implies problems related to the basic properties such as the insufficient adhesiveness. The method (2) has problems that if a blended inorganic filler has a grain diameter of 0.01 μm or more, the resultant composition can not provide a sufficient transparency, and that if the grain diameter is smaller than 0.01 μm, it exhibits a viscosity which is abruptly increased with a small amount of the inorganic filler being added, a poor storage stability, and so on.

As a solvent-based adhesive which has excellent transparency without blending a filler, urethane adhesives, polyvinyl chloride adhesives and the like are placed on the market. However, when transparent adherends are adhered each other using the solvent-based adhesive, for its flowability there are formed starved areas due to air between the adherends and the adhesive, unless the adherends are adhered with a fair amount of solvent remaining therein. Such starved joints lead disadvantageously to opaque portions existing at adhering areas. The solvent included in the adhesive may also unfavorably dissolve plastics and bring about some cracks on adherends.

OBJECT AND SUMMARY OF THE INVENTION

The present inventors have devoted themselves to advance investigations so as to obtain a moisture curable composition of sufficient transparency which satisfies the basic properties of an adhesive and a sealing material, and consequently attained the present invention.

It is therefore an object of the present invention to provide a moisture curable composition which is excellent in transparency, operating efficiency and storage stability, and is suitable for use as an adhesive, a sealing material or the like.

To solve the above problem, a moisture curable composition according to the present invention is produced by blending 100 parts by weight of a mixture (A) comprising (1) a copolymer having reactive silicon groups which can be cross-linked by hydrolysis, whose molecular chain has (i) alkylacrylate and/or alkylmethacrylate monomeric units having an alkyl group with 1 to 8 carbon atoms, and (ii) alkylacrylate and/or alkylmethacrylate monomeric units having an alkyl group with 10 or more carbon atoms, and (2) an oxyalkylene polymer including reactive silicon groups which can be cross-linked by hydrolysis, and 2 parts by weight to 300 parts by weight of amorphous powder (B) having a grain diameter ranging from 0.01 μm to 300 μm.

DETAILED DESCRIPTION OF THE INVENTION

The reactive silicon group in the mixture (A) of the present invention represents a functional group including silicon which can form cross-linking through siloxane linkage. A preferred example of the reactive silicon group will be expressed by the following general formula (I):

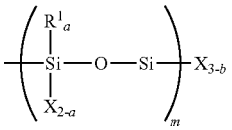

(I)

where $R^1$ represents a substituted or unsubstituted monovalent organic group having 1 to 20 carbon atoms or a triorganosiloxy group; X represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18.

The mixture (A) used in the present invention may include a polymer including silyl groups, or an acrylic polymer including silyl groups.

The amorphous powder (B) used in the present invention may be amorphous polymeric powder or amorphous silica. As for crystal materials such as calcium carbonate which are generally used as additives, they are apt to cause birefringence due to their optical anisotropy and lead to lower transparency due to light scattering so that they are unpreferable as additives in the present invention.

The polymeric powder used in the present invention is produced by emulsion polymerization, suspension polymerization or the like, and is commercially available. While (metha)acrylic acid, (metha)acrylate, vinyl acetate, ethylene and vinyl chloride are known as monomers for wide uses, the above-mentioned polymeric powder is made from a starting material of a polymer obtained by solely polymerizing one of these monomers or as the need arises by copolymerizing these monomers and one or more other monomers in consideration of particularly required properties such as adhesiveness or the like. Among monomers for wide uses as mentioned above, methylmethacrylate is particularly preferable since polymeric powder made therefrom is excellent in transparency, and weather resistance.

As the amorphous polymeric powder, poly(metha) acrylate powder, particularly, polymethylmethacrylate powder is preferably used. The advantages of polymethylmethacrylate powder used as the amorphous polymeric powder in the present invention are as follows: ① It exhibits low birefringence. ② It readily comes to hand because a plurality of makers place it on the market. ③ It has a refractive index dose to those of polymers including silyl groups commercially available so that it readily affords transparency to the moisture curable composition of the present invention.

The refractive indexes of the amorphous materials and the polymers including silyl groups commercially available are shown in Table 1.

TABLE 1

| Material | Refractive index |
|---|---|
| Polystyrene (PS) | 1.59 |
| Polycarbonate (PC) | 1.59 |
| Polyethylene (HDPE) | 1.54 |
| Polyvinyl chloride (PVC) | 1.53 |
| Polyethylene-vinyl acetate (EVA) | 1.49 |
| Polymethylmetacrylate (PMMA) | 1.49 |
| Polypropylene (PP) | 1.48 |
| SILYL MAX450 *1 | 1.47 |
| SILYL SAT350 *2 | 1.45 |
| Fused silica | 1.45 |

*1 SILYL MAX450: a trade name of a mixture of a polymer with a main chain of polyoxypropylene having dimethoxysilyl groups at molecular terminals, and a polymer with a main chain of a copolymer of polymethacrylate having dimetoxysilyl groups in a molecule (manufactured by Kanegafuchi Chemical Industry Co., Ltd.).
*2 SILYL SAT350: a trade name of a polymer with a main chain of polyoxypropylene having dimethoxysilyl groups at molecular terminals (manufactured by Kanegafuchi Chemical Industry Co.).

Here, the blending parts by weight of the blended amorphous powder (B) with respect to 100 parts by weight of the mixture (A) are preferably in a range of 2 parts by weight to 300 parts by weight, more preferably in a range of 5 parts by weight to 150 parts by weight, and most preferably in a range of 10 parts by weight to 75 parts by weight, particularly from viewpoints of adhesiveness and flowability. If the blending parts by weight do not reach 2 parts by weight, sufficient adhesiveness cannot be provided. On the other hand, if it exceeds 300 parts by weight, the viscosity of the resultant composition becomes extremely high to make a cured composition fragile, thus leading to a lower bonding strength.

If the amorphous powder (B) has a grain diameter smaller than 0.01 μm, it is difficult to obtain monodispersed dry powder. On the contrary, if the grain diameter exceeds 300 μm, the thickness of an adhesive layer cannot be reduced, thereby causing a problem such as a surface devoid of smoothness or the like. Thus, the grain diameter of the amorphous powder (B) is preferably in a range of 0.01 μm to 300 μm, more preferably in a range of 0.1 μm to 100 μm, and most preferably in a range of 1 μm to 30 μm.

To further improve the transparency of the moisture curable composition of the present invention, it is preferable to mate the refractive index of the mixture (A), which is a liquid phase and composed of the copolymer (1) having reactive silicon groups and the oxyalkylene polymer (2), as close as possible with the refractive index of the amorphous powder (B), which is a solid phase. The difference of the refractive indexes between the liquid phase and the solid phase is preferably in a range of 0.03 to 0.1, more preferably 0.02 to 0.05, and most preferably in a range of 0.01 to 0.02 particularly from a viewpoint of transparency.

For mating the refractive index of the mixture (A), which is a liquid phase, with that of the amorphous powder (B), which is a solid phase, the mixture (A), may be blended with a required amount of a compatible material such as a petroleum resin. Alternatively, for mating the refractive index of the solid phase with that of the liquid phase, the blending ratio of monomers in the amorphous powder (B), which is a solid phase, may be changed fittingly.

As a method of mating the refractive index of the amorphous powder (B), which is a solid phase, with the refractive index of the mixture (A), which is a liquid phase, there is (1) a method of approaching the refractive index of the mixture (A) to the refractive index of the amorphous powder (B); and (2) a method of approaching the refractive index of the amorphous powder (B) to the refractive index of the mixture (A).

As for the method (1), when the solid phase is polymeric powder since the refractive index of the mixture (A) which is a liquid phase is generally lower than that of the solid phase, the refractive index of the mixture (A) can be increased by heating a material having a refractive index higher than that of the mixture (A) (approximately 1.46 to 1.48) to melt it into a reactive polymer. Examples of the material having a refractive index higher than that of the mixture (A) include an epoxy resin (for example, Epicoat 828 (bisphenol A having a refractive index of 1.57, manufactured by Yuka Shell Epoxy Co., Ltd.); a petroleum resin (for example, FTR6100 (a copolymer of C5 and C9) having a refractive index of 1.56, manufactured by Mitsui Chemicals Inc.); and a terpene phenol resin (for example, Polyster T145 having a refractive index of 1.59, manufactured by Yasuhara Chemicals Co., Ltd.).

As for the method (2), for increasing the refractive index of the amorphous powder (B), there is a method of copolymerizing monomers, for example, vinyl chloride (having a refractive index of 1.53 (polymer)), acrylonitrile (having a refractive index of 1.52 (polymer)), or the like with (metha) acrylate monomers used in the present invention. For reducing the refractive index of the powder (B), there is a method of copolymerizing monomers, for example, laurylmethacrylate (having a refractive index of 1.44 (monomer)), allylmethacrylate (having a refractive index of 1.44 (monomer)), 2(2-ethoxyethoxy)ethylacrylate (having a refractive index of 1.43 (monomer)), or the like with (metha)acrylate monomers used in the present invention.

The moisture curable composition of the present invention may become a non-solvent-based adhesive or a non-solvent-based sealing material which is free from the above-mentioned disadvantages of a solvent-based adhesive. There has conventionally unknown such an adhesive or a sealing material possessing both of adhesiveness and transparency. Using poly(methacrylate) powder as amorphous polymeric powder, the moisture curable composition of the present invention becomes excellent in chemical resistance such as acid resistance, and exhibits advantages such as a specific gravity reducing effect. Conventional inorganic powder such as calcium carbonate is inferior in acid resistance and exhibits disadvantages such as a specific gravity increasing effect.

When plastic materials are adhered with the moisture curable composition of the present invention, an effect can be seen in an improved adhesiveness which cannot be provided by a conventional composition using calcium carbonate as a filler.

There may be added to the moisture curable composition of the present invention a variety of additives which do not spoil the transparency thereof. For example, silica fine powder may be added as inorganic powder. Also, a tackifier may be added as required. It is further possible to add a liquid material which does not dissolve the amorphous powder if it is required to adjust the viscosity.

EXAMPLES AND COMPARATIVE EXAMPLES

In the following, the present invention will be described in more specific manner with reference to several examples.

Examples 1–4 and Comparative Examples 1–2

Respective components were placed in a planetary mixer with blending ratios shown in Table 2, mixed for one hour at 100° C. and 10 mmHg, and then cooled to 20° C. A curing catalyst and a tackifier were added to the mixed components, and all the components were vacuum mixed for ten minutes to obtain room temperature curable compositions for the respective blending ratios.

The blending amount of FTR8100 is determined in the following manner. First, FTR8100 serving as a refractive index adjusting agent is heated and melted into a polymer having a reactive silicon group at a proper ratio, and the refractive index of the melt is measured by an Abbe refractometer at 20° C. The relationship between the blending ratio of FTR8100 and the refractive index of the resultant mixture is plotted on an X-Y coordinate plane. The blending amount of FTR8100 whose refractive index is in accord with that of powder used as a main filler is the detected blending amount.

Further, the respective room temperature curable compositions were evaluated with respect to storage stability, transparency and bonding strength, and the results were listed in a lower part of Table 2.

Storage Stability (*1): The ratio of the viscosity after the lapse of seven days at 50° C. to the initial viscosity was evaluated as follows: ◎: more than 1.2 times; ○:1.2–1.3 times; and X: less than 1.3 times.

Transparency (*2): The adhesive was spread between two acrylic plates of 2 mm in thickness using a spacer of 3 mm, and the transparency was observed and evaluated as follows: ◎: colorless and transparent; ○: colorless but slightly opaque; and X: opaque.

Bonding Strength (*3): The adhesive was applied in a thickness of 200 μm over an adhering area of 25×25 mm of two acrylic plates (2×25×100 mm) respectively, and the acrylic plates were adhered to each other after the lapse of an open time (a time of exposure to atmospheric moisture) of three minutes. The adhesive was cured for seven days at 20° C., and its bonding strength was measured at a tensile speed of 50 mm/minute.

As is apparent from Table 2, Example 1 exhibits particularly good transparency and a high bonding strength because of the use of MR13G as a transparent filler. Example 2 exhibits slightly degraded transparency since a combination of MR13G and Fuselex E2 is used as a transparent filler so that the refractive index of Fuselex E2 should be mated with the refractive index of MR13G.

TABLE 2

| | | REFRACTIVE INDEX | EXAMPLE No. 1 | 2 | 3 | 4 | COMPARATIVE EXAMPLE No. 1 | 2 |
|---|---|---|---|---|---|---|---|---|
| BLENDING AMOUNT (PARTS BY WEIGHT) | SILYL MAX450 | 1.47 | 100 | 100 | 100 | — | 100 | 100 |
| | SILYL SAT350 | 1.45 | — | — | — | 100 | — | — |
| | MR13G | 1.49 | 50 | 40 | 40 | — | — | — |
| | Fuselex E2 | 1.45 | — | 5 | — | 40 | — | — |
| | AEROSIL 200 | 1.45 | — | — | 5 | — | 10 | — |
| | FTR8100 | 1.56 | 17 | 17 | 17 | — | — | — |
| | Dibutyltindilaurate | 1.50 | 2 | 2 | 2 | 2 | 2 | 2 |
| | SH6020 | — | 4 | 4 | 4 | 4 | 4 | 4 |
| PROPERTY EVALUATION | Storage Stability *1 | — | ◎ | ◎ | ◎ | ○ | x | ◎ |
| | Transparency *2 | — | ◎ | ○ | ◎ | ◎ | ○ | ◎ |
| | Bonding Strength *3 ($N/cm^2$) | — | 380 | 420 | 450 | 150 | 210 | 100 |

The components in Table 2 are as follows:

SILYL MAX450: a trade name of a mixture of a polymer with a main chain of polyoxypropylene having dimethoxysilyl groups at molecular terminals, and a polymer with a main chain of a copolymer of polymethacrylate having dimetoxysilyl groups in a molecule (manufactured by Kanegafuchi Chemical Industry Co., Ltd.).

SILYL SAT350: a trade name of a polymer with a main chain of polyoxypropylene having dimethoxysilyl groups at molecular terminals (manufactured by Kanegafuchi Chemical Industry Co., Ltd.).

MR13G: a trade name of methacrylate polymeric powder (having an average grain diameter of approximately 1 μm) (manufactured by Soken Chemicals Co., Ltd.).

FTR8100: a trade name of a petroleum resin having a copolymer of C5 and C9 (manufactured by Mitsui Chemicals Inc.).

Fuselex E2: a trade name of amorphous silica (having an average grain diameter of approximately 5 μm) (manufactured by Tatsumori Co., Ltd.).

AEROSIL 200: a trade name of silica fine powder (manufactured by Nippon AEROSIL Co., Ltd.).

Dibutyltindilaurate: a curing catalyst.

SH6020: a trade name of a silane coupling agent (γ-(2-aminoethyl) aminopropyltrimethoxysilane) (manufactured by Toray Dow Corning Silicone Co., Ltd.).

The respective property evaluations in Table 2 were conducted in the following manner.

Example 3 exhibits good transparency since Fuselex E2 in Example 2 is replaced with AEROSIL 200 which has a finer grain diameter than Fuselex E2. In addition, the bonding strength is also increased since the cohesive force of the cured composition is higher probably by virtue of the added AEROSIL.

In Example 4, SILYL SAT350 is used as a polymer having reactive silicon groups, which is a liquid phase, since Fuselex E2 which has a low refractive index is used as a transparent filler. Although the composition of Example 4 exhibits a lower bonding strength as compared with Examples 1–3, Example 4 is listed in Table 2 as a blending example of a sealing material which only needs a lower bonding strength than an adhesive.

In Comparative Example 1 in which AEROSIL 200 (silica fine powder) was only added, while the transparency and the bonding strength were good, the storage stability was significantly lower. Also, in Comparative Example 2 where no filler including inorganic powder was added, it was found that while the storage stability and the transparency were excellent, the bonding strength was significantly lower.

As described above, the moisture curable composition of the present invention is excellent in transparency, operating efficiency and storage stability, and is suitable for use as an adhesive and a sealing material.

Obviously, various minor changes and modifications of the present invention are possible in the light of the above teaching. It is therefore to be understood that within the scope of appended claims the invention may be practiced otherwise than as specifically described.

What is claimed is:

1. A moisture curable composition produced by blending:

100 parts by weight of a mixture (A) comprising:

(1) a copolymer having reactive silicon groups which can be cross-linked by hydrolysis, whose molecular chain has:

(i) alkylacrylate and/or alkylmethacrylate monomeric units having an alkyl group with 1 to 8 carbon atoms; and (ii) alkylacrylate and/or alkylmethacylate monomeric units having an alkyl group with 10 or more carbon atoms; and (2) an oxyalkylene polymer including reactive silicon groups which can be cross-linked by hydrolysis; and 2 parts by weight to 300 parts by weight of polymethyl methacrylate powder (B) having a grain diameter ranging from 0.01 μm to 300 μm, *wherein said mixture (A) has a first refractive index, and said polymethyl methacrylate powder (B) has a second refractive index, and wherein a difference of the first refractive index and second refractive index is 0.1 or less.*

2. A moisture curable composition according to claim 1, wherein said mixture (A) has a refractive index mated with a refractive index of said polymethyl methacrylate powder (B).

3. A moisture curable composition according to claim 1 or 2, wherein said mixture (A) includes at least one polymer including silyl groups.

4. A moisture curable composition according to claim 3, wherein said polymer is an acrylic polymer including silyl groups.

*5. A moisture curable composition produced by blending:*

*100 parts by weight of a mixture (A) comprising:*

*(1) a copolymer having reactive silicon groups which can be cross-linked by hydrolysis, whose molecular chain has:*

*(i) alkylacrylate and/or alkylmethacrylate monomeric units having an alkyl group with 1 to 8 carbon atoms; and*

*(ii) alkylacrylate and/or alkylmethacrylate monomeric units having an alkyl group with 10 or more carbon atoms; and*

*(2) an oxyalkylene polymer including reactive silicon groups which can be cross-linked by hydrolysis; and*

*2 parts by weight to 300 parts by weight of polymethyl methacrylate powder (B) having a grain diameter ranging from 0.01 μm to 300 μm,*

*further comprising:*

*amorphous silica having a grain diameter ranging from 0.01 μm to 300 μm, wherein said mixture (A) has a first refractive index, and a mixture of said polymethyl methacrylate powder (B) and said amorphous silica has a second refractive index, and wherein a difference of the first and second refractive indexes is 0.1 or less.*

*6. The moisture curable composition according to claim 5, wherein said mixture (A) includes at least one polymer including silyl groups.*

*7. The moisture curable composition according to claim 6, wherein said polymer is an acrylic polymer including silyl groups.*

* * * * *